INVENTOR.
Joe R. Urschel
BY
ATTORNEY.

June 16, 1953   J. R. URSCHEL   2,642,068
MACHINE FOR REMOVING GREEN CORN FROM THE COB
Filed Jan. 6, 1949   5 Sheets-Sheet 3
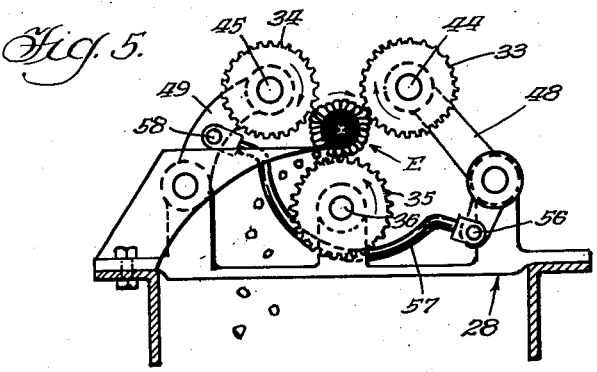
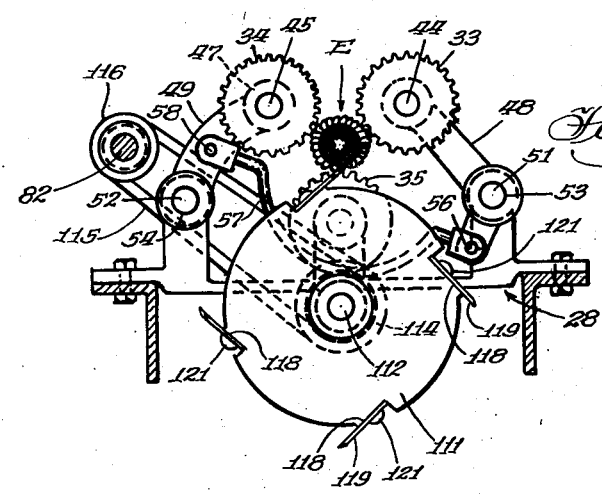
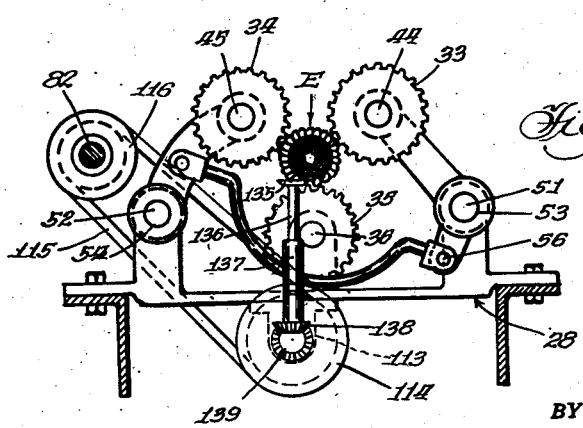
INVENTOR.
Joe R. Urschel
BY
ATTORNEY.

June 16, 1953  J. R. URSCHEL  2,642,068
MACHINE FOR REMOVING GREEN CORN FROM THE COB
Filed Jan. 6, 1949  5 Sheets-Sheet 4

INVENTOR.
Joe R. Urschel
BY
ATTORNEY.

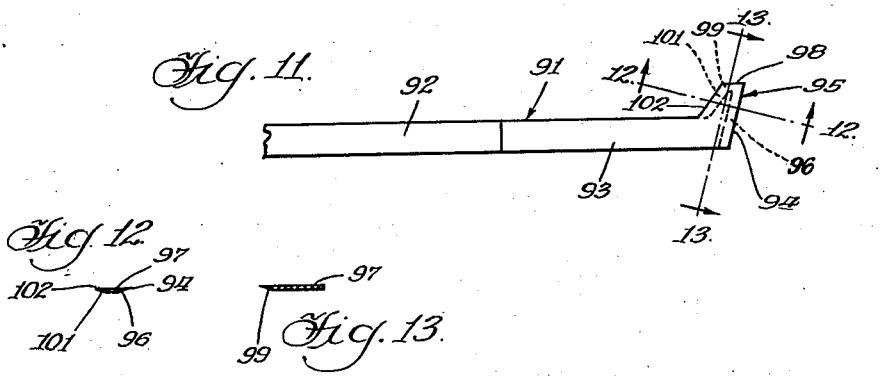
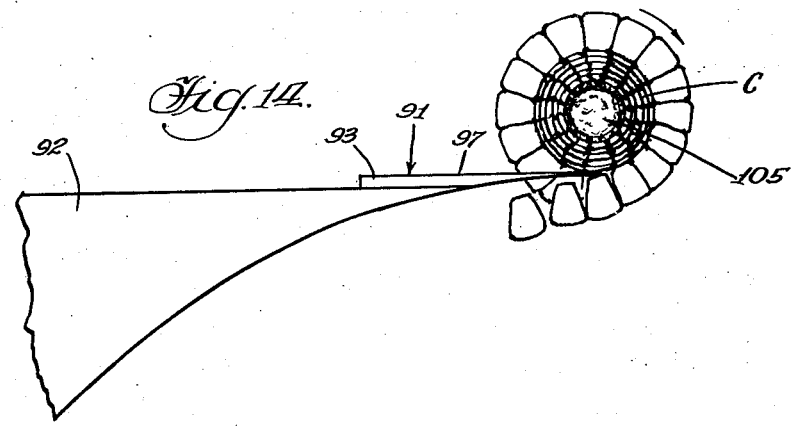
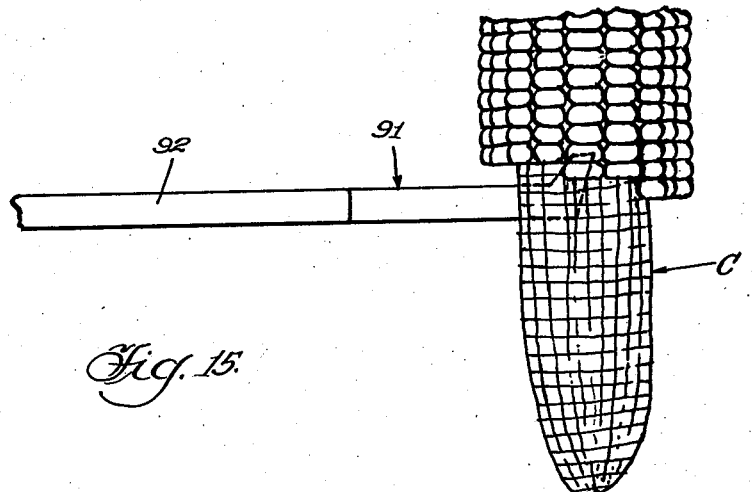

Patented June 16, 1953

2,642,068

UNITED STATES PATENT OFFICE 2,642,068

MACHINE FOR REMOVING GREEN CORN FROM THE COB

Joe R. Urschel, Valparaiso, Ind.

Application January 6, 1949, Serial No. 69,483

13 Claims. (Cl. 130—9)

This invention concerns machines for removing immature corn kernels from the cob upon which they are grown. The machine embodiment herein illustrated for disclosing the invention is of a type utilizable by industrial canners for removing sweet corn from the cob preparatory to canning.

In the art of preparing corn for canning there are two general classes of corn, first, the so-called creamed corn of which the kernels are chopped or mashed as they are removed from the cob and, second, the whole kernel corn which is removed from the cob without division or mutilation. The present invention concerns a type of machine useful in the process of preparing the whole kernel corn. This is the fancy grade for which consumers are willing to pay a greater price.

An important object of this invention is the provision of a machine having few and simply constructed parts and operable upon a principle which involves no inordinate strain or wear upon any of the machine parts. Particularly, the machine is adapted to handle ears of corn in a manner that a straight edge knife is used for shaving the kernels from the cob. Such a knife is easily installed and replaced and requires a minimum of servicing, in contrast to curved edge knives and complicated rotary mounting heads therefor employed in currently popular prior art machines.

A further object of this invention is the provision of ear corn holding and maneuvering mechanism so cooperable with a knife for shaving the corn from the cob that the position of the knife edge is gauged from the surface of the cob instead of from the outer periphery of the kernel bearing portion of the ear. This assures that the knife edge will be adapted to remove the corn kernels exactly as desired at the cob surface irrespective of the diameter of the entire ear of corn or the diameter of the cob.

Another object is the provision of a new type of corn ear holding and maneuvering mechanism comprising a plurality of rollers which are spaced circumferentially about a path along which a corn ear is axially advanced thereby, and the rollers extending generally parallel to such path but being turned somewhat diagonally of the path in the same circumferential direction thereabout. This diagonal disposition of the rollers with respect to the axis of the path through which the ear corn is to be advanced enables them to cause such advancement of the ear when they are rotated in the same direction. This rotation of the ear holding and maneuvering rollers causes them to rotate the ear while moving it endwise and thereby adapts this mechanism for cooperation with a stationary knife for shaving the corn kernels from the cob while the latter is moved endwise in general parallelism with an edge of the knife which is disposed for shaving the kernels from the cob as it rotates.

A further object is the provision of ear holding and maneuvering rollers including a set of such rollers adapted for engaging the kernel bearing portion of the ear and an axially spaced set of rollers for directly engaging the cob from which the corn has been removed. The kernel engaging rollers have a pliable elastic periphery to enable them to apply pressure directly to the corn kernels to obtain sufficient drive traction therewith without mutilating the kernels. The peripheries of the cob engaging rollers on the other hand possess a hard surface having projections or spicules for penetrating the cob surface and obtaining a relatively positive driving engagement therewith.

A further object is the provision of a corn kernel removing machine wherein there are axially spaced kernel-engaging and cob-engaging sets of rollers of which one roller in each set is disposed upon one side of a path along which the corn ear is to be axially advanced, and there being cooperative rollers in each set on other sides of the path and adjustable radially thereof for cooperating with the one rollers for gripping the corn ear at a distant one side of the periphery thereof with respect to the one rollers and with respect to a knife which removes the corn kernels from the cob as the ear is rotated and axially advanced by the rollers.

A further object is the provision of a corn kernel removing machine into which corn ears can be fed at random with perfect safety to the operator because of the absence of reciprocating feeding rams or the like found in contemporary corn kernel removing machines.

These and other desirable objects inherent in and encompassed by the invention will be more readily comprehendible from the ensuing description, the appended claims and the annexed drawings, wherein:

Fig. 5 is a transverse sectional view taken in elevation on the irregular line 5—5 of Fig. 1, illustrating a partially treated corn ear and showing the relation of the knife and of the kernel engaging rollers with respect thereto.

Fig. 6 is a view taken similarly to Fig. 5 but illustrating a rotary knife structure installed in the machine in place of the stationary knife structure of Fig. 5, the knife structure of Fig. 6 being adapted to fragmentate the kernels in the process of producing creamed corn.

Fig. 7 is also a view taken similarly to Fig. 5 but showing a further modified knife structure embodying a rotatable disk blade which operates to fragmentate the kernels as well as to shave the cob in the process of producing creamed corn.

Fig. 11 is a plan view of the knife holder and knife shown in Figs. 1, 5, and 8.

Figs. 12 and 13 are sectional views taken respectively on the planes indicated by the lines 12—12 and 13—13 in Fig. 11.

Figure 1:
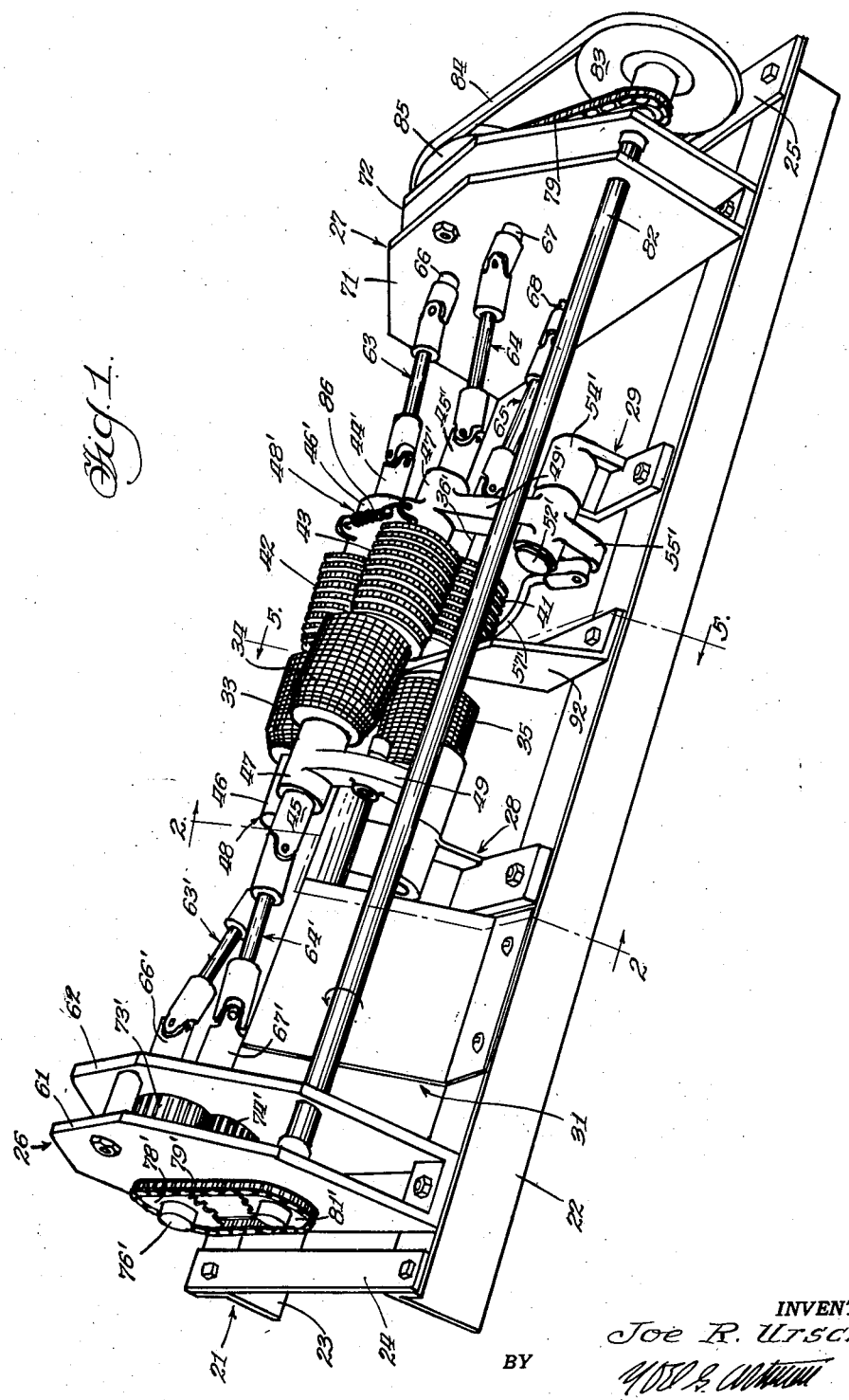
Fig. 1 is a perspective view of a machine embodying a preferred form of the invention, the view being taken from the front and disclosing a portion of the feeding end thereof.
Figure 8:
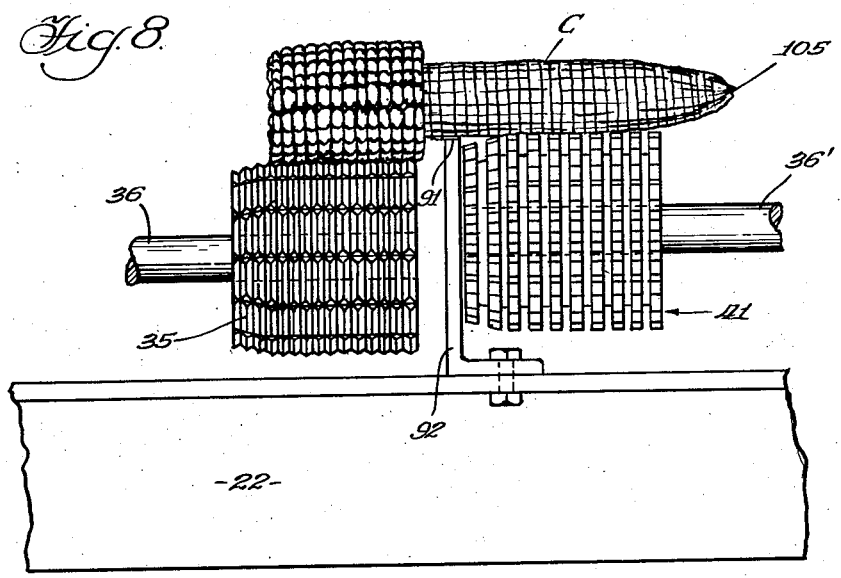
Fig. 8 is a fragmentary front elevational view showing non-roving rollers respectively of the kernel-engaging and cob-engaging roller-clusters together with a partially treated ear of corn and the knife illustrated in Figs. 5 and 11 to 15.

Fig. 14 is a fragmentary side elevational view of the knife holder of Figs. 1, 5, and 8 and knife thereon, illustrating the manner in which the knife is disposed with respect to the periphery of a cob during operation of the machine.

Fig. 15 is a plan view of the subject shown in Fig. 14.

Referring now to Fig. 1 the machine can there be seen to be mounted upon a base 21 consisting of laterally spaced rails 22 and 23 formed of angle iron pieces and secured together at their ends by flat metal cross bars 24 and 25. A pair of gear housings 26 and 27 also extend between opposite end portions of the side rails 22 and 23 and are rigidly mounted thereon, wherefor these gear housings augment the rigidity of the frame. Bearing frames 28 and 29 are also secured to and extend between the side rails 22 and 23. These two bearing frames 28 and 29 are essentially identical wherefor an understanding of the shape of each is ascertainable from the end view of the frame 28 in Fig. 2.

Figure 2:
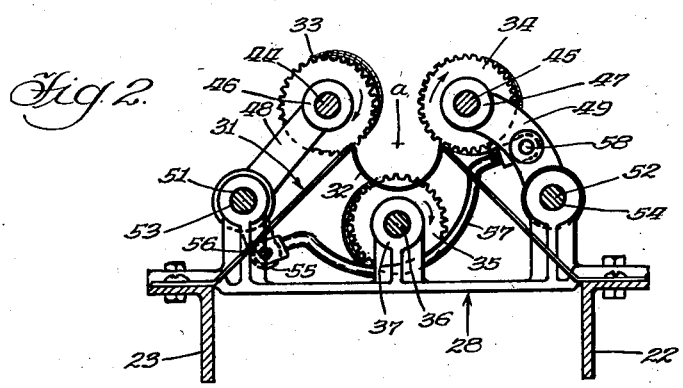
Fig. 2 is a transverse sectional view taken on the irregular line 2—2 of Fig. 1, showing the mounting of a set of kernel engaging rollers.

An ear feeding trough 31, shown in Figs. 1 and 2, also extends between and is mounted upon the side rails 22 and 23, a semi-circular central portion 32 of the trough being adapted to have the ears of corn dropped successively thereinto for endwise guiding into a set of kernel engaging rollers 33, 34, and 35. These rollers 33, 34, and 35 are structurally identical but are mounted differently and are differently oriented with respect to the machine.

Roller 35 embodies a core shaft 36 journalled within a bearing 37 of the bearing frame 28, Fig. 2. The bearing 37 and the core shaft 36 have a common horizontal axis but the bearing is so disposed that this axis is disposed diagonally to the axis $a$ coincident with the center of curvature of the trough depression 32, Fig. 2, and substantially centrally located with respect to the path traversed by each ear passing endwise through the roller cluster 33, 34, and 35. In Fig. 2 it can be seen that the more distantly disposed end of the roller 35 is somewhat farther to the left than the adjacent end of such roller. Likewise the roller 33 can be seen in Fig. 2 to be arranged with its more distant end displaced circumferentially of the axis $a$ in an upward direction from the position of the adjacent end of such roller, and, the more distant end of the roller 34 can also be seen to be displaced circumferentially of the axis $a$ downwardly with respect to the adjacent end of such roller. An observation of the rollers 33, 34, and 35 in Fig. 2 will disclose that these rollers are arranged lengthwise of the axis $a$ but are disposed slightly diagonally with respect thereto progressively in the same direction circumferentially. The surface portions of the rollers 33, 34, and 35 disposed radially inwardly towards the axis $a$ engage respective peripheral portions of the kernel bearing part of the ears.

The rollers 33, 34, and 35 are rotated in the same direction about their individual axes as indicated by the arrows on such rollers, and this coordinated rotation of the rollers together with their diagonal arrangement relatively to the axis $a$ adapts them to cause clockwise rotation of an ear of corn E engaged thereby as such ear is viewed in Fig. 5, and to concurrently cause endwise advancement of the ear toward and into a set of cob engaging rollers 41, 42 and 43.

Core shafts 44 and 45 of the kernel engaging rollers 33 and 34 are journalled in bearings 46 and 47 upon the upper ends of arms 48 and 49 which are pivoted upon pins 51 and 52 anchored in holes 53 and 54 of the bearing frame 28. The axes of bearings 46 and 47 are respectively coincident with the axes of the kernel-engaging rollers 33 and 34 and the axes of the cylindrical pins 51 and 52 are in respective parallelism with the axes of rollers 33 and 34. Arm 48 has a downward extension 55 pivotally connected by a pin 56 with an end of a curved tie rod 57 having its opposite end pivotally connected by a pin 58 with the arm 49. Pins 56 and 58 are spaced the same distance radially respectively from the axes of pins 51 and 52 wherefor the rod 57 is operably to coordinate pivotal movement of the arms 48 and 49 and consequently swinging motion of the kernel-engaging rollers 33 and 34 so that these rollers are caused to occupy equal distances from the axis $a$ to maintain an ear of corn in direct vertical relation with respect to the roller 35.

Inasmuch as the core shafts of the rollers 33, 34 and 35 are disposed in non-parallel relation and non-perpendicularly to side walls 61 and 62 of the gear housing 26, these core shafts are driven by identical double universal joint assemblies from respective shafts projecting perpendicularly outwardly of the housing wall 62. Double universal joint assembly 64' connects the core shaft 45 with a shaft 67' journalled in and projecting from the gear casing wall 62. A double universal joint structure 63' connects the roller core shaft 44 with a shaft 66' journalled in and projecting from the casing wall 62. These two shafts 66' and 67' are disposed respectively co-axial with shafts 66 and 67 projecting outwardly from a wall 71 of the gear housing 27. A third shaft (not shown) is journalled in and projects outwardly from the gear housing wall 62 at a position coaxial with a shaft 68 projecting outwardly from the gear housing wall 71, and said shaft (not shown) is connected with the core shaft 36 of the kernel-engaging roller 35 by a double universal joint structure corresponding to the double universal joint structure 65.

The gearing in housing 26 for driving the three shafts which are connected by the universal joint structures with the roller core shafts 33, 34, and 35 is essentially identical with the gearing in housing 27. Therefore reference will now be had to Figs. 3 and 4 which disclose the gearing in the gear housing 27.

Gear housing 27 comprises the laterally spaced side walls 71 and 72 through which shafts 66, 67 and 68 extend and wherein said shafts are journalled. These shafts 66, 67, and 68 carry gears 73, 74 and 75 which are respectively constrained for rotation therewith. A third shaft, 76, extends between and is journalled in the gear housing end walls 71 and 72 and carries a gear 77 constrained for rotation therewith and mutually meshed with the gears 73, 74 and 75. A sprocket wheel 78 is constrained for rotation with an outer end portion of the shaft 76 and causes rotation of the shaft and consequently of the gears 77, 73, 74 and 75 when this sprocket is driven by a chain 79 which is trained about and driven from a sprocket 81 fixed upon a long shaft 82 journalled in and extending between the gear casings 26 and 27, Fig. 1. A pulley 83 is also fixed to the shaft 82 and receives driving force from an electric motor through a belt 84 and a pulley 85 mounted upon the armature shaft of said motor.

The set of cob engaging rollers 41, 42 and 43 are mounted similarly to the kernel engaging rollers 35, 33 and 34. Each of these rollers has a core shaft, the roller 42 having a core shaft 44' corresponding to the core shaft 44 of the roller 33, the roller 43 having a core shaft 45' corresponding to the core shaft 45 of the roller 34 and the roller 41 having a core shaft 36' corresponding to the core shaft 36. Core shaft 36' is journalled in a fixed bearing (not shown) but disposed upon the bearing frame 29 similarly to the disposal of the bearing 37 on the frame 28. Bearings 46' and 47' upon pivoted arms 48' and 49' rotatively carry the shafts 44' and 45'. A motion correlating rod 57' pivotally interconnects an extension 55' of the arm 49' with the arm 48' so that these two pivoted arms 47' and 48' will be caused to move simultaneously and in the same direction radially of the axis a appearing as a point in Fig. 2. A pivotal mounting pin 52' for the arm 49' is anchored in a socket 54' of the bearing frame 29, and a similar mounting (not shown) is provided for the arm 48'. A helical contraction spring 86 connected between the upper ends of the pivoted arms 47' and 48' yieldably urges the cob engaging rollers 42—43 radially inwardly with respect to the axis a. It is contemplated that a corresponding spring can be used between the pivoted arms 48 and 49 for urging kernel-engaging rollers 33 and 34 radially inwardly for increasing their pressure upon the periphery of an air of corn engaged thereby.

The cob-engaging rollers 41, 42 and 43 are caused to rotate in the same direction as the kernel-engaging rollers and the bearings respectively supporting the core shafts of these cob-engaging rollers are turned slightly angularly to the axis a in the same direction diagonally thereof as are the kernel-engaging rollers so that when such cob-engaging rollers are in engagement with a cob they operate complementarily with the kernel-engaging rollers for rotating and axially advancing the corn ear.

It has been explained hereinabove that the gearing within to the gear casing 26 is essentially identical with that in the casing 27. Two of the gear elements within the casing 26 are exposed in Fig. 1, they being gears 73' and 74' respectively corresponding to the gears 73 and 74 and respectively constrained for rotation with the shafts 66' and 67'. This gearing is driven from the long shaft 82 by means of sprockets 81' and 78' and a chain 79'. Sprocket 78 is constrained for rotation with a shaft 76' corresponding to the shaft 76, Fig. 4. The ratio of teeth upon the sprockets 81' and 78' are so selected with respect to the ratio of the teeth on the sprockets 81 and 78 that the peripheral speed of the kernel-engaging rollers will somewhat exceed the peripheral speed of the cob-engaging rollers so no substantial slippage will occur between the kernel-engaging rollers and the ear kernels engaged thereby after the cob is engaged upon its more slowly moving periphery by the cob engaging rollers.

Figure 9:
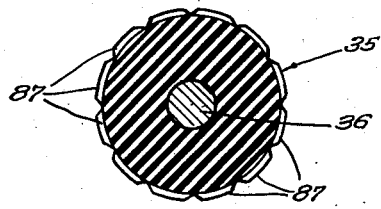
Fig. 9 is a sectional view taken transversely through one of the kernel-engaging rollers.

Fig. 9 which is a sectional view taken through the kernel-engaging roller 35 illustrates that such roller has its body formed of a rubber-like substance mounted upon the core shaft 36. Peripheral projections 87 formed integrally with the rubber-like body of the roller are shaped to enable them to partially mesh with the kernels on an ear being operated upon and thereby to increase the traction with the corn kernels. Inasmuch as the projections 87 are formed of a yieldable elastic substance the likelihood of their injuring the corn kernels is diminished. Rollers 33 and 34 are constructed identically with the roller 35.

Figure 10:
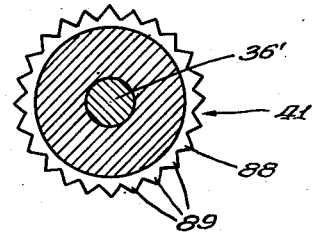
Fig. 10 is a sectional view taken through one of the cob-engaging rollers.

A cross sectional view of the cob engaging roller 41 is shown in Fig. 10. The body of this roller is made of metal, and an inspection of Figs. 8 and 10 will reveal that this roller has a plurality of axially spaced circumferential ribs 88 each having circumferentially spaced spicule-like projections 89. Each of the rollers 41, 42 and 43 is identically constructed. These non-yieldable projections 89 upon the cob-engaging rollers are adapted to penetrate the cob and cause these rollers to have non-slipping traction therewith.

A knife 91 for slicing or shaving the corn kernels from the cob is supported upon base side rail 22 by a bracket 92. Details of the knife are illustrated in Figs. 11–14. The knife has a shank 93 carried perpendicularly to the axis a, Fig. 2, and consequently perpendicularly to the axial path of travel of an ear of corn being operated upon by the machine. Edge 94 of this knife is disposed angularly to the knife shank and to the longitudinal surface elements of the cob C in the machine; see Fig. 14. A portion of the cutting edge 94 extends onto a lateral projection 95 of which the upper face is coplanar with the upper face of the shank 93. Said edge 94 is formed at the intersection of a beveled under surface 96 and the coplanar upper surface 97 of the shank 93 and its lateral extension 95. A cutting edge 98 is formed at the tip of the extension 95 and at the intersection of the coplanar surface 97 and a beveled underside portion 99 of said extension. A further beveled underside portion 101 of the knife intersects the surface 97 at an edge 102 of the projection 95.

In Figs. 1 and 8 it is ascertainable that the knife holding bracket 92 is disposed between the contiguous axially spaced clusters of rollers 33—34—35 and 41—42—43, and in Figs. 8, 14 and 15 it is ascertainable that the laterally projecting portion 95 of the knife 91 projects axially of the ear along its under side toward the set of rollers 33—34—35. The coplanar upper side 97 of the knife is adapted to slide along the under surface of the cob while the diagonally disposed cutting edge 94 shaves the kernels from the rotating ear, the ear being rotated by the sets of rollers in the direction of the arrow in Fig. 14.

*Operation of the machine with the species of knife disclosed in Figs. 8 and 11 to 14*

Figure 3:
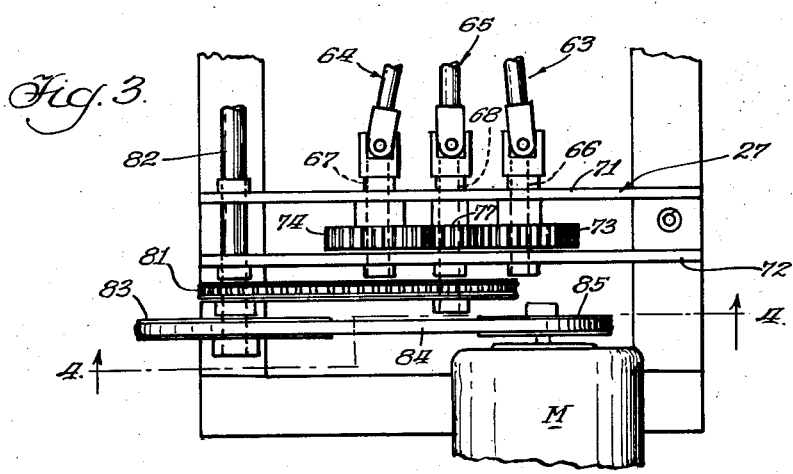
Fig. 3 is a fragmentary view taken from above showing a right end portion of the machine (as viewed in Fig. 1) together with a portion of a driving motor for the machine.
Figure 4:
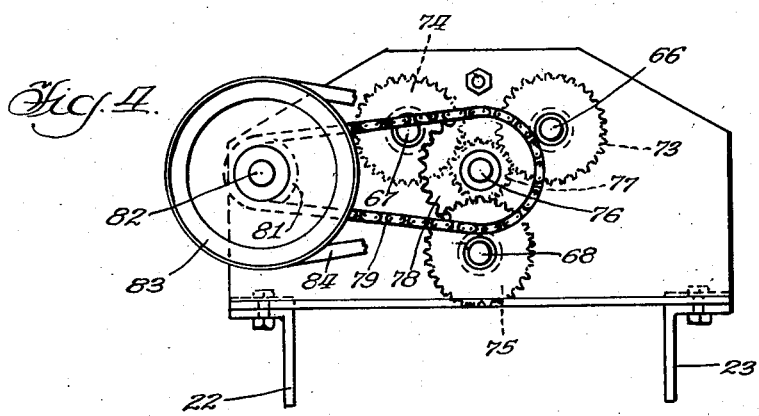
Fig. 4 is a transverse sectional view taken in elevation upon the irregular line 4—4 of Fig. 3.

The machine is placed in operation by starting the electric motor M, Fig. 3. The motor through the pulley 85, belt 84 and the pulley 83 drives the long shaft 82 clockwise as viewed in Fig. 4 and as shown by the arrow in Fig. 1. The chain 79' cooperates with the sprockets 81' and 78' for driving the shafts and gears in the gear housing 26 in the direction for causing the kernel-engaging rollers 33, 34 and 35 to be rotated clockwise as viewed in Fig. 2. The chain 79 operates the gearing in the gear casing 27 for causing the cob-engaging rollers to rotate in the same direction as the kernel-engaging rollers. An ear of immature corn will then be placed in the semi-circular portion 32 of the trough 31 with the distal end 105 of the ear pointed towards the rollers. Thereupon the ear will be manually moved endwise for engagement by the rotating rollers 33, 34 and 35.

The left ends of these rollers, as viewed in Fig. 1, are tapered to provide a flared throat for receiving the normally tapered distal end of the ear. This enables the rollers to commence their contact with the kernels along a portion of greater lineal extent to minimize pressure concentration upon the kernels contacted. As soon as the rollers 33—34—35 initially engage the distal end of the ear they will commence to rotate such ear and because of their arrangement angularly of the axial path of travel of the ear they will impart an axial component of force to the ear for advancing it endwise toward the set of cob-engaging rollers 41—42—43.

Normally the ear will increase in diameter for a short distance axially inwardly from its distal end so that as the ear enters endwise between the set of rollers 33—34—35 it will react upon the non-roving or non-laterally displaceable roller 35 for radially displacing the rollers 33 and 34. The non-roving roller 35 is therefore adapted to predetermine the position of the cob surface with respect to the knife projection 95 and the cutting edge 98. In Fig. 8 is can be seen that the knife 91 is supported above the upper side of the non-roving roller 35 so the cutting edge 98 of the knife will first enter a distal end portion of the ear adjacently to the roots of the kernels. Because of the cutting edge 98 being disposed upon the end of the lateral projection 95 the kernels first engaged by the knife will be sliced cleanly from the cob, thus minimizing kernel mutilation.

Immediately after the distal end of the rotating ear passes the knife the cob portion from which the kernels have been removed by the knife will be projected into the throat formed by the cluster of cob engaging rollers 41—42—43. It is ascertainable from both Fig. 1 and Fig. 8 that the receiving ends of the rollers 41—42—43 are tapered similarly to the receiving ends of the rollers 33—34—35 to cause flaring of the throat formed thereby to be more receptable of the distal end of the ear. The uppermost peripheral portion of the lowermost roller 41, Fig. 8, is at substantially the same elevation as the knife 91, and inasmuch as the two rollers 42 and 43 are displacable radially of the throat these two rollers are cooperable to accommodate any diameter of cob while holding the cob firmly against the upper most peripheral section of the roller 41. Consequently while the cob is being advanced along the upper peripheral section of the non-roving roller 41 the position of the knife 91 is in effect guagable from the lower peripheral section of the cob. The knife is therefore setable for causing it to press against the lower peripheral section of the cob with any desired degree of firmness so the depth of cut of the kernels from the cob is predeterminable irrespective of the diameter of the cob or of the kernel bearing periphery of the ear.

After the kernel bearing periphery of the ear advances endwise beyond radial registration with the kernel-engaging rollers 33—34—35 the rotating cob-engaging rollers will continue their action upon the cob for rotating and advancing the ear through the machine while maintaining the surface of the cob in the predetermined relation with the knife as the final kernels are severed from the cob. As the cob is discharged from between the discharge ends of the cob-engaging rollers it is allowed to drop through the space between the side rails 22 and 23 into a receptacle or onto a conveyer belt.

In Fig. 6 there is shown a species of knife means operable to chop the corn into pieces in the process of making creamed corn as well as shaving the cob of root portions of the kernels. A rotary knife carrier 111 in the form of a disk is constrained for rotation with a shaft 112 journalled in a bearing 113, Fig. 7, depending from the bearing frame 28. Shaft 112 is driven by a pulley 114 thereon and a belt 115 which is also trained over a pulley 116 on the shaft 82.

Tangential faces 118 are formed in the periphery of the disk carrier 111, and knives 119 are secured to these faces by machine screws 121. These knives are so disposed radially of the shaft 112 that their cutting edges will sweep transversely across the lower peripheral portion of the cob C during rotation and axial advancement of the ear E. Rotation of the carrier 111 is sufficiently fast for the knives 119 to chop the corn from the cob, as it moves endwise across the carrier, that all of the kernels will be chopped and the periphery of the cob will be progressively shaved of all root portions of the kernels. It is contemplated that the knife carrier 111 can be reversed end for end simultaneously with the belt 115 being crossed for reversing the direction in which the carrier is rotated. By thus causing carrier 111 to rotate in the same direction as the ear of corn the knives are caused to strike the radially outer portions of the kernels before the root portions thereof in cutting such kernels from the cob. Creaming the kernels is thereby facilitated since the knives tend to push the kernels into the cob instead of uprooting them from the cob during the cutting operation.

A disk knife 135, Fig. 7, for cutting the corn kernels into pieces and shaving the cob of all kernel root portions while the ear is rotated and advanced axially, is supported upon the upper end of a knife carrier 136 in the form of a shaft journalled in a bearing 137. This bearing 137 is supported upon the bearing frame 28. The lower end of the knife carrier shaft 136 carries a beveled gear 138 which meshes with and is driven by a companion beveled gear 139 on the shaft 113. This knife is so disposed with respect to the non-roving rollers of the machine that the right edge portion thereof as viewed in Fig. 7 will coincide with the lower surface portion of the cob C, and the main body of the knife extends tangentially of the cob from its lower surface portion. As ear E is rotated and axially advanced, a spiricular surface portion of the ear is swept past the knife 135 wherefore the knife is operable to shave the root portions of the kernels from the ear. Prior to these root portions arriving in registry with the cusp of the knife portions in engagement with the cob, a circumferential portion of the knife edge adjacently to the cusp will enter to the kernels for cutting them into pieces and mutilating them in the process of producing creamed corn.

It should be understood that the particular embodiment of the invention herein illustrated and described is illustrative of the invention and not restrictive thereof and that other embodiments falling within the scope of the invention will become apparent to those skilled in the art.

I claim:

1. In a machine for removing the kernels from the cob of an immature ear of corn while such ear is advanced endwise substantially co-axially of a path to be traversed thereby, a plurality of at least three ear-engaging rollers spaced circumferentially about said path and directed lengthwise thereof and slightly diagonally thereof and to one another in the same direction of and to one another in the same direction progressively about such path, means for urging at least one of said rollers radially inwardly with respect to said path for causing an ear of corn to be complementally grasped by said rollers, means for rotating the rollers respectively about their individual axes in the same direction to cause them to rotate the ear of corn while advancing the same axially, and a shearing tool mounted along side of said path and having a shearing edge arranged substantially parallel therewith for scraping the periphery of the cob to shear the corn therefrom during said rotation and endwise advancement of the ear.

2. In a machine for removing the kernels from the cob of an immature ear of corn while such ear is advanced endwise substantialy co-axially of a path to be traversed thereby, a set of ear-engaging rollers comprising rollers spaced circumferentially about said path and directed lengthwise and diagonally thereof in the same direction progressively about such path, a set of cob-engaging rollers spaced endwise of said path from the first set of rollers and also spaced circumferentially about the path and directed lengthwise and diagonally thereof in the same direction progressively about such path, means for urging at least one roller of each set radially inwardly with respect to said path for causing the rollers of the first set to complementally engage the kernels upon an untreated portion of the ear and to cause the rollers of the second set to complementally engage a portion of the cob from which the kernels have been removed, means for rotating all of said rollers in the same direction whereby they are adapted to complementally rotate the ear while causing endwise advancement thereof, and a shearing knife disposed between the sets of rollers and having a shearing edge extending substantially in parallelism with the path for scraping the periphery of the cob while shearing the kernels therefrom as the cob is advanced into the second set of rollers.

3. The combination set forth in claim 2 wherein the rollers in the first set comprise a peripheral portion of pliable elastic material adapted to directly engage the kernels without inflicting mutilation thereto.

4. The combination set forth in claim 3 wherein the periphery formed by the pliable elastic material embodies surface embodiments essentially meshable with the corn kernels to increase drive traction between the kernal-engaging rollers and the ear.

5. The combination set forth in claim 2 wherein the second set of rollers comprise hard spicules projecting outwardly from their cylindrical peripheries for penetrating the cob and forcefully engaging the same to increase the tractive engagement therewith.

6. In a machine for removing the kernels from the cob of an immature ear of corn while such ear is advanced endwise substantially co-axially of a path to be traversed thereby, a frame, a plurality of at least three ear-engaging rollers spaced circumferentially about said path and directed lengthwise and diagonally thereof and to one another in the same direction progressively about such path, bearing means for one of said rollers and mounted in a fixed position upon said frame, bearing means for other of such rollers being mounted upon the frame for transverse movement inwardly of such path for causing an ear of corn to be complementally gripped by said rollers, means for rotating the rollers respectively about their individual axes in the same direction to cause them to rotate the gripped ear while advancing the same axially along said path, and a shearing tool mounted on said frame on the same radial side of the path as the one roller and having a shearing edge extending lengthwise of said path for scraping a circumferential section of the cob substantially in radial registry with a section of the ear contacted by the one roller, to shear the corn from the cob during such rotation and endwise advancement of the ear.

7. In a machine for removing the kernels from the cob of an immature ear of corn while such ear is advanced endwise substantially co-axially of a path to be traversed thereby, a frame, a plurality of at least three cob-engaging rollers spaced circumferentially about said path and directed lengthwise and diagonally thereof and to one another in the same direction circumferentially of such path, bearing means for one of said rollers and mounted in a fixed position upon said frame, bearing means for other of such rollers being mounted upon the frame for transverse movement inwardly of such path for causing an ear of corn to be complementally gripped by said rollers, means for rotating the rollers respectively about their individual axes in the same direction to cause them to rotate the gripped ear while advancing the same axially along said path, and a shearing tool mounted on said frame on the same radial side of the path as the one roller and having a shearing edge extending lengthwise of said path for scraping a circumferential section of the cob substantially in radial registry with a section of the ear contacted by the one roller, to shear the corn from the cob during such rotation and endwise advancement of the ear.

8. In a machine for shearing kernels from an immature ear of corn while axially advancing the same lengthwise of a path of movement for such ear, a cluster of kernel-engaging rollers spaced circumferentially about said path for gripping onto a kernel bearing section of an ear, a cluster of cob-engaging rollers also spaced circumferentially about said path, the cob-engaging rollers being spaced endwise of the path from the kernel engaging rollers for directly engaging a cob portion from which the kernels have been removed, and kernel shearing means disposed between said clusters of rollers, each of said rollers extending lengthwise of said path and diagonally thereof in the same direction circumferentially thereof, means for rotating the rollers to cause them to rotate said ear while advancing the same endwise from the kernel-engaging rollers toward the cob-engaging rollers, and said kernel severing means being adapted to scrape the cob and remove the kernels from the portion thereof imminent to entering the cob-engaging roller cluster.

9. In the combination set forth in claim 8 wherein there is means for driving the kernel engaging rollers at one peripheral speed, and means for driving the cob engaging rollers at a slower peripheral speed.

10. In a machine for removing the kernels from an ear of immature corn while axially advancing the same lengthwise of a path to be traversed thereby, a trough disposed substantially coaxial with and adjacent to a section of said path, a cluster of kernel-engaging rollers arranged lengthwise of said path and spaced circumferentially about a section thereof in endwise contiguity with said trough, means rotatively supporting the rollers with their axis directed diagonally of the path in the same direction progressively thereabout, a cluster of cob-engaging rollers also arranged lengthwise of said path and spaced circumferentially thereabout at the opposite end of the kernel-engaging roller cluster with respect to said trough and endwise spaced from the kernel-engaging cluster, means rotatively supporting the cob-engaging rollers with their axis diagonally of the path in the same direction progressively thereabout, means for rotating all of said rollers in the same direction to advance such ear, and a cob shaving knife disposed between said roller clusters and having a kernel shearing edge extending lengthwise of said path in position to substantially coincide with the surface of a cob being advanced from the kernel-engaging roller cluster into the cob-engaging roller cluster.

11. In a machine for shearing the kernels from an immature ear of corn while such ear is axially advanced lengthwise of a path to be traversed thereby, a frame, a kernel-engaging roller cluster comprising a plurality of rollers spaced circumferentially about said path and extending endwise thereof, bearing means fixed to the frame for supporting one of said rollers in non-roving relation at one side of said path, swingable bearing arms pivotally connected with the frame and containing bearings, other of said rollers being journalled in said bearings respectively, said arms being swingable to carry the rollers journalled therein inwardly and outwardly of said path in a radial direction, said arms being biased to swing in the direction for carrying the rollers radially inwardly, a cob-engaging roller cluster in spaced end-to-end relation with respect to the kernel-engaging roller cluster, bearing means upon the frame for one of the cob-engaging rollers to mount the same in non-roving relation with respect to the path at the same side thereof as the other non-roving roller, bearing arms swingably mounted upon the frame for swinging motion to carry the bearings therein radially of said path, other of the cob engaging rollers being journalled in the bearings of such arms to be moved radially of said path pursuant to swinging of the arms, said arms being biased to swing in the direction for carrying the cob-engaging rollers therein radially inwardly of the path, means for rotating all of said rollers in the same direction, all of said rollers being inclined slightly diagonally of the path in the same direction circumferentially thereof to adapt the rollers for complementally rotating and endwise advancing an ear gripped therebetween, and a cob shaving knife disposed between said roller clusters and having a kernel shearing edge disposed lengthwise of and at the same side of the path as the non-roving rollers and for shaving the periphery of the cob of the rotated ear.

12. In a machine for cutting immature corn kernels from the cob of an ear, ear holding and axially advancing means comprising a cluster of rollers extending lengthwise of an ear receiving throat formed therebetween, said rollers being adapted when rotated to engage respective circumferentially spaced portions of an ear disposed in said throat and to rotate and axially advance the ear, a knife carrier rotatable about an axis laterally spaced from said throat and extending lengthwise thereof, and a plurality of knives mounted on said carrier in radially spaced relation with respect to the axis thereof, said knives being adapted to sweep transversely past and in contiguity with a peripheral portion of the cob of the rotating and axially advancing ear so as to chop the corn kernels and shave the cob of the root portions of the kernels during rotation of the knife carrier and of said rollers.

13. In a machine for shearing the kernels from an immature ear of corn while such ear is axially advanced lengthwise of a path to be traversed thereby, a frame, a kernel-engaging roller cluster comprising a plurality of rollers spaced circumferentially about said path and extending endwise thereof, bearing means fixed to the frame for supporting one of said rollers in non-roving relation at one side of said path, bearing means for other of said rollers and mounted on said frame for movement radially toward and away from said path in concert with the rollers journalled therein having similar movement, means biasing said movable bearing means and the rollers journalled therein radially inwardly of said path, a cob-engaging roller cluster in spaced end-to-end relation with respect to the kernel-engaging roller cluster, bearing means upon the frame for one of the cob-engaging rollers to mount the same in non-roving relation with respect to the path at the same side thereof as the other non-roving roller but less distantly from said path than the non-roving kernel-engaging roller, additional bearing means in which other of the cob-engaging rollers are journalled and being movable radially of said path together with the rollers journalled therein, means biasing said additional bearings and the cob-engaging rollers therein radially inwardly of the path, means for rotating all of said rollers in the same direction, all of said rollers being inclined slightly diagonally of the path in the same direction circumferentially thereof to adapt the rollers for complementally rotating and endwise advancing an ear gripped therebetween, and cob-shaving knife means disposed between said roller clusters at the same side of the path as the non-roving rollers and for shaving the periphery of the cob of the rotated ear.

JOE R. URSCHEL.

References Cited in the file of this patent

UNITED STATES PATENTS

| Number | Name | Date |
|---|---|---|
| 460,336 | Gutenkunst | Sept. 29, 1891 |
| 484,808 | Morral | Oct. 25, 1892 |
| 497,693 | Taylor | May 16, 1893 |
| 516,399 | Morral | Mar. 13, 1894 |
| 1,282,788 | Fenn | Oct. 29, 1918 |
| 1,282,791 | Fenn | Oct. 29, 1918 |
| 1,380,259 | Sharp | May 31, 1921 |
| 1,553,630 | Polk | Sept. 15, 1925 |
| 1,651,591 | Foster | Dec. 6, 1927 |
| 1,652,379 | Shields | Dec. 13, 1927 |
| 1,979,615 | Grayson | Nov. 6, 1934 |
| 2,335,594 | Kerr | Nov. 30, 1943 |

FOREIGN PATENTS

| Number | Country | Date |
|---|---|---|
| 344,433 | German-Nieter | Nov. 22, 1921 |